(12) United States Patent
Zong et al.

(10) Patent No.: US 9,411,802 B2
(45) Date of Patent: Aug. 9, 2016

(54) METHOD FOR LABELING SEMANTIC ROLE OF BILINGUAL PARALLEL SENTENCE PAIR

(75) Inventors: Chengqing Zong, Beijing (CN); Tao Zhuang, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 680 days.

(21) Appl. No.: 13/519,626

(22) PCT Filed: May 30, 2011

(86) PCT No.: PCT/CN2011/074877
§ 371 (c)(1),
(2), (4) Date: Apr. 11, 2013

(87) PCT Pub. No.: WO2012/019478
PCT Pub. Date: Feb. 16, 2012

(65) Prior Publication Data
US 2013/0204606 A1    Aug. 8, 2013

(30) Foreign Application Priority Data
Aug. 9, 2010   (CN) .......................... 2010 1 0248198

(51) Int. Cl.
*G06F 17/28* (2006.01)
*G06F 17/27* (2006.01)

(52) U.S. Cl.
CPC .......... *G06F 17/2785* (2013.01); *G06F 17/271* (2013.01); *G06F 17/277* (2013.01); *G06F 17/2827* (2013.01)

(58) Field of Classification Search
CPC ..... G06F 17/20; G06F 17/27; G06F 17/2705; G06F 17/2785; G06F 17/28; G06F 17/2809

USPC .......................................... 704/1, 2, 4, 7, 8, 9
See application file for complete search history.

(56) References Cited

U.S. PATENT DOCUMENTS

| 8,126,698 B2 * | 2/2012 | Washizawa et al. .............. 704/2 |
| 8,209,163 B2 * | 6/2012 | Suzuki et al. .................... 704/2 |

(Continued)

FOREIGN PATENT DOCUMENTS

| CN | 1567297 A | 1/2005 |
| CN | 101446942 A | 6/2009 |
| CN | 101908042 A | 12/2010 |

OTHER PUBLICATIONS

Van der Plas, Lonneke, James Henderson, and Paola Merlo. "D6. 2: Semantic Role Annotation of a French-English Corpus." (2010).*

(Continued)

*Primary Examiner* — Paras D Shah
(74) *Attorney, Agent, or Firm* — Patterson Thuente Pedersen, P.A.

(57) ABSTRACT

Methods for Semantic Role Labeling (SRL) of bilingual sentence pairs. Steps in this invention include tokenizing and part-of-speech tagging a bilingual sentence pair, performing word alignments on the bilingual sentence pair, finding word-aligned predicate pairs in the bilingual sentence pair, generating argument candidates for each predicate using monolingual SRL system, and performing joint inference to obtain the SRL results and argument alignment for each predicate pair. This method produces more accurate SRL results on both sides of bilingual sentence pairs. Furthermore, this method also aligns the predicate-argument structures between the sentence pairs.

19 Claims, 3 Drawing Sheets

(56) References Cited

U.S. PATENT DOCUMENTS 8,275,605 B2 * 9/2012 Menezes et al. ............... 704/5
2008/0319735 A1 12/2008 Kambhatla et al.

OTHER PUBLICATIONS

Fung, Pascale, et al. "Learning bilingual semantic frames: Shallow semantic parsing vs. semantic role projection." 11th Conference on Theoretical and Methodological Issues in Machine Translation (TMI 2007). 2007.*

Chen, Xiao, et al. "Better parser combination." Recall 81.83.86 (2009): 86-89.*

Seeker, Wolfgang, et al. "Hard constraints for grammatical function labelling." Proceedings of the 48th Annual Meeting of the Association for Computational Linguistics. Association for Computational Linguistics, 2010.*

Burkett, David, and Dan Klein. "Two languages are better than one (for syntactic parsing)." Proceedings of the Conference on Empirical Methods in Natural Language Processing. Association for Computational Linguistics, 2008.*

Koomen, Peter, et al. "Generalized inference with multiple semantic role labeling systems." Proceedings of the Ninth Conference on Computational Natural Language Learning. Association for Computational Linguistics, 2005.*

Fung, Pascale, et al. "Automatic learning of chinese english semantic structure mapping." Spoken Language Technology Workshop, 2006. IEEE. IEEE, 2006.*

Fung, Pascale, and Benfeng Chen. "BiFrameNet: bilingual frame semantics resource construction by cross-lingual induction." Proceedings of the 20th international conference on Computational Linguistics. Association for Computational Linguistics, 2004.*

Toutanova, Kristina, Aria Haghighi, and Christopher D. Manning. "A global joint model for semantic role labeling." Computational Linguistics 34.2 (2008): 161-191.*

Padó, Sebastian, and Mirella Lapata. "Cross-lingual annotation projection for semantic roles." Journal of Artificial Intelligence Research 36.1 (2009): 307-340.*

Björkelund, Anders, Love Hafdell, and Pierre Nugues. "Multilingual semantic role labeling." Proceedings of the Thirteenth Conference on Computational Natural Language Learning: Shared Task. Association for Computational Linguistics, p. 43-54, 2009.*

"Software (/software/) > Stanford Word Segmenter," The Stanford Natural Language Processing Group, http://nlp.standford.edu/software/segmenter.shtml, as accessed on Mar. 10, 2016, 4 pages.

"Software (/software/) > Stanford Log-linear Part-Of-Speech Tagger," The Stanford Natural Language Processing Group, http://nlp.stanford.edu/software/tagger.shtml, as accessed on Mar. 10, 2016, 8 pages.

Och, Franz Josef, "GIZA++: Training of statistical translation models." http://www.fjoch.com/giza-training-of-statistical-translation-models.html, as accessed on Mar. 10, 2016, 3 pages.

"Berkeleyparser", https://github.com/slavpetrov/berkeleyparser, as accessed on Mar. 10, 2016, 2 pages.

Dan Bikel's Software, http://www.cis.upenn.edu/~dbikel/software.html, dated Apr. 1, 2013, Wayback as accessed on Mar. 10, 2016, 3 pages.

"Software (/software/) > Stanford Parser," The Stanford Natural Language Processing Group, http://nlp.stanford.edu/software/lex-parser.shtml, as accessed on Mar. 10, 2016, 13 pages.

Martha Palmer et al., "The Proposition Bank: An Annotated Corpus of Semantic Roles" Computational Linguistics, vol. XX, No. X, pp. 1-33, 2005.

Mihai Surdeanu et al., "Combination Strategies for Semantic Role Labeling", Journal of Artificial Intelligence Research 29 (2007) 105-151, Jun. 2007.

Nianwen Xue, University of Colorado at Boulder, "Labeling Chinese Predicates with Semantic Roles", Computational Linguistics, vol. 34, No. 2, pp. 226-255, Jun. 19, 2007.

Sameer S. Pradhan et al., "Towards Robust Semantic Role Labeling", Computational Linguistics, vol. 34, No. 2, pp. 289-310, Jun. 19, 2007.

Sebastian Padó et al., "Cross-lingual Annotation Projection of Semantic Roles", Journal of Artificial Intelligence Research 36 (2009) 307-340, 34 pages, Nov. 2009.

Charles J. Fillmore, Department of Linguistics, University of California Berkeley, Berkeley, California 94720, "Frame Semantics and the Nature of Language", Annals New York Academy of Sciences, pp. 20-32, 1976.

* cited by examiner

METHOD FOR LABELING SEMANTIC ROLE OF BILINGUAL PARALLEL SENTENCE PAIR

PRIORITY CLAIM

This application is a National Phase entry of PCT Application No. PCT/CN2011/074877, filed May 30, 2011, which claims priority from CN Application No. 201010248198.7, filed Aug. 9, 2010, which applications are hereby incorporated by reference herein in their entirety.

FIELD OF THE INVENTION

This invention relates to the field of Natural Language Processing. Specifically, this invention relates to bilingual Semantic Role Labeling.

BACKGROUND OF THE INVENTION

SRL is a shallow semantic analysis technique that is useful for many applications, such as information extraction, machine translation, etc. Given a sentence, SRL aims to find out the predicates and their arguments in the sentence and assign a semantic role label for each argument. For example, the sentence "Foreign invested companies have become the growing point of investment in China's foreign trade." will be labeled as "[Foreign invested companies]$_{A1}$ have [become]$_{Pred}$ [the growing point of investment in China's foreign trade]$_{A2}$." in SRL. In the example above, "become", labeled as "Pred", is a predicate. A predicate usually stands for an action and has several related arguments. "Foreign invested companies", labeled as "A1", is the actor. "the growing point of investment in China's foreign trade", labeled as "A2", is the new state that the actor becomes.

A widely used standard for SRL is the PropBank annotation standard, which defines a role set containing six key argument types: A0, A1, A2, A3, A4, A5, and many adjunct argument types whose label begins with "AM", such as AM-TMP, AM-ADV, etc. A detailed description of the PropBank annotation standard can be found in Martha Palmer, Daniel Gildea, and Paul Kingsbury. 2005. The Proposition Bank: An Annotated Corpus of Semantic Roles. *Computational Linguistics*, 31(1): 71-106.

The example above shows that by analyzing the predicate-argument structure of a sentence, SRL can extract the semantic framework of the sentence, which makes SRL very useful for many applications such as Information Extraction, Machine Translation, Automatic Summarization, etc.

In applications such as Machine Translation, SRL is needed to be performed on bilingual sentence translation pairs. Table 1 shows an example of a Chinese-English sentence translation pair.

TABLE 1

中国建筑市场近年来对外开放步伐进一步加快
In recent years the pace of opening up to the outside of China's construction market has further accelerated Performing bilingual SRL on the sentence pair above, we should get the following results:

Different from a monolingual SRL task, in a bilingual SRL task, a pair of sentences are presented at the same time. Conventional methods for bilingual SRL performs monolingual SRL on each side of bitext separately. However, the accuracy of the conventional method is quite low and the SRL results are often inconsistent between two sides of bitext.

SUMMARY OF THE INVENTION

Embodiments of the invention include a bilingual SRL method which exploits the semantic equivalency of bitext to produce more accurate and more consistent SRL results. Moreover, an embodiment of the invention also aligns the arguments between two sides of bitext.

According to an embodiment, a method in this invention comprises the following steps:

Step 1: Tokenizing a bilingual sentence pair and finding word-aligned predicate pairs in a bilingual sentence pair;

Step 2: For each predicate, using a monolingual SRL method to generate argument candidates;

Step 3: For each predicate, merging its duplicate argument candidates into one;

Step 4: For each word-aligned predicate pair, performing joint inference to obtain their arguments and the alignment between these arguments.

Because a bilingual sentence pair is a translation pair, their meanings are equivalent. The semantic equivalence between two sides of bitext means that they should have consistent predicate-argument structures. This bilingual argument structure consistency can guide us to find better SRL results. This invention utilizes the argument structure consistency to perform bilingual SRL. To validate the effectiveness of this invention, experiments have been carried out on Chinese-English parallel Prop-Bank data. Using the method in this invention, F1 scores of SRL results on Chinese and English text achieve 80.06% and 81.12% respectively, which are 2.05 and 1.71 points higher than the results of baseline monolingual SRL combination systems respectively.

DETAILED DESCRIPTION OF THE INVENTION

A bilingual SRL method is described according to an embodiment. Although the following description may contain specific details, they should not be construed as limiting

---

中国 建筑 市场 近年 来 对 外 开放 步伐 进一步 加快
[    A1    ] [AM-TMP] [    C-A1    ] [AM-ADV] [Pred]
In recent years the pace of opening up to the outside of China's construction market has further accelerated
[ AM-TMP ] [                    A1                    ] [ A2 ] [ Pred ]

the claims in any way. Other configurations of the described embodiments of the invention are part of the scope of this invention. Accordingly, the appended claims and their legal equivalents should only define the invention, rather than any specific examples given.

As described in the experimental validation section below, embodiments of this invention can be implemented as programs in Python 2.6 language in Ubuntu Linux 9.04 system. This implementation can also run on Windows 7 systems. In other embodiments, other language implementations and other system implementations are utilized.

Figure 1:
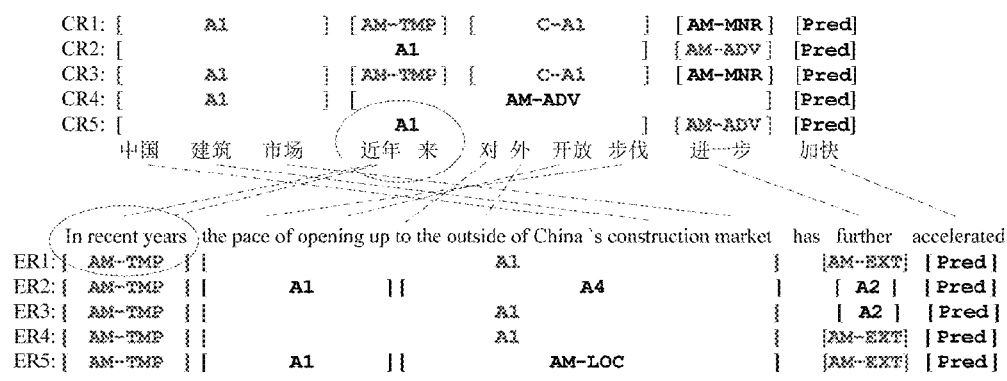
FIG. 1 illustrates several results of conventional bilingual SRL methods, which perform monolingual SRL on each side of bitext separately, according to an embodiment of the present invention.

According to an embodiment of the invention, exploitation of the semantic equivalence between two sides of bitext finds better SRL results. FIG. 1 shows the an embodiment which is a Chinese-English sentence pair. In FIG. 1, the SRL results are obtained by performing monolingual SRL on each side of bitext separately. The monolingual SRL system employed in this invention is based on maximum entropy classifier as described in Nianwen Xue. 2008. Labeling Chinese Predicates with Semantic Roles. Computational Linguistics, 34(2): 225-255.

On each side of bitext in FIG. 1, five candidate results are obtained, with each row showing a result. But none of the candidate results are completely correct.

Figure 2:
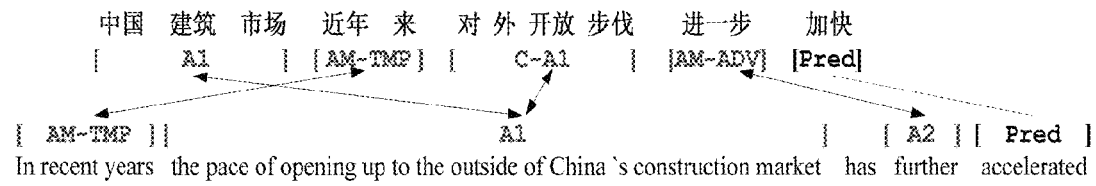
FIG. 2 illustrates the correct bilingual SRL results and the argument alignments between SRL results on two sides, according to an embodiment of the present invention.

The completely correct result is shown in FIG. 2. Note that each candidate result is partially correct because it contains some correctly labeled arguments as shown in FIG. 1, where the correctly labeled argument is shown in red color. At the same time, FIG. 2 shows that correct bilingual SRL results has good argument-structure consistency, with the arrows showing the alignments between arguments on two sides. Therefore, if each of the candidate results are broken into arguments, and find a combination of these arguments that has a good argument-structure consistency, better SRL results are achieved.

Figure 3:
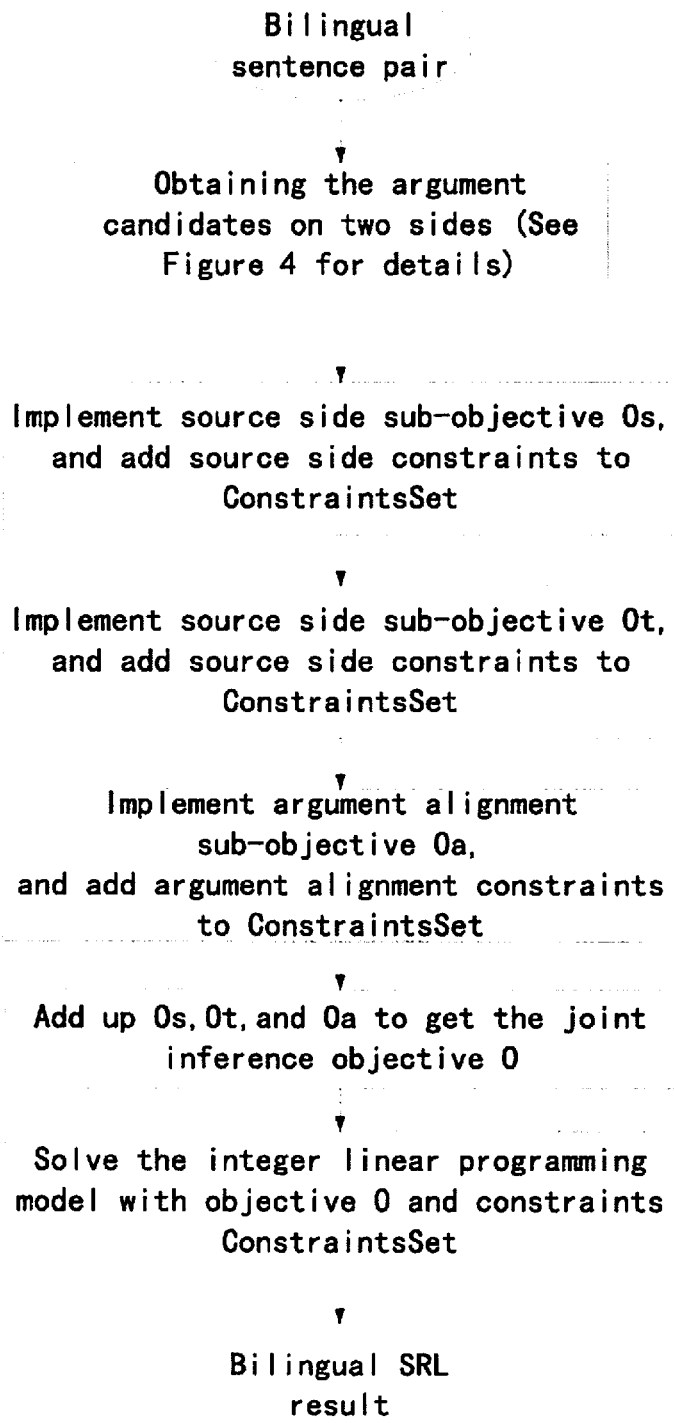
FIG. 3 is a diagram of a joint inference process, according to an embodiment of the present invention.
Figure 4:
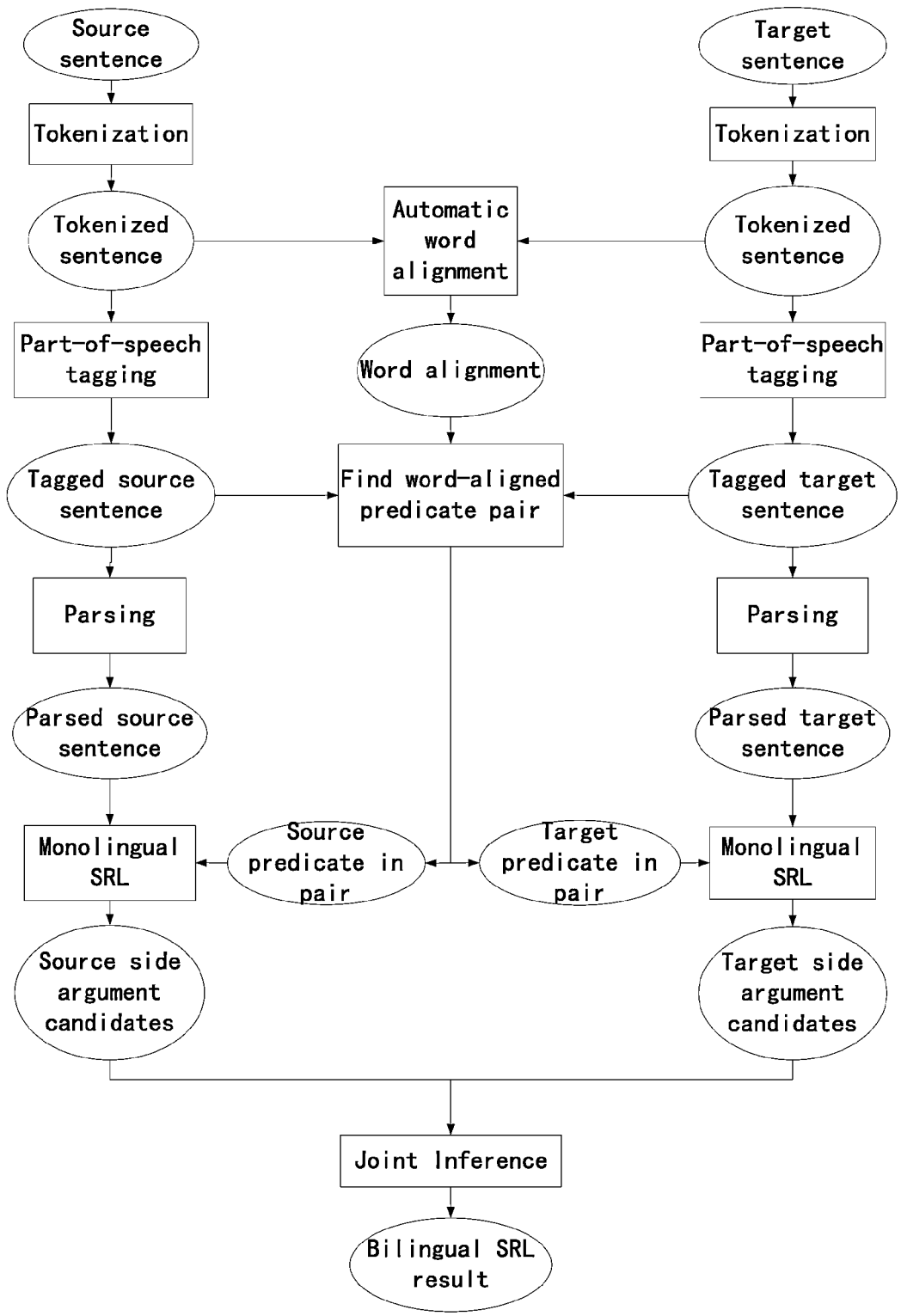
FIG. 4 is a diagram of a bilingual SRL method, with detailed illustration of the argument candidate generation process, according to an embodiment of the present invention.

Referring to FIG. 3, according to an embodiment of the invention, the steps of this invention include:

Step 1: Tokenizing bilingual sentence pair and finding word-aligned predicate pairs in a bilingual sentence pair. The details are as follows:

Step 1.1: Doing tokenization and Part-Of-Speech tagging on each side of bitext.

For English, tokenization means to single out each English word, which is very simple. For Chinese, tokenization means to do word segmentation. There are many open source tools to do Chinese word segmentation. In an embodiment, Stanford Chinese Word Segmenter available at nlp.stanford.edu can be utilized, according to an embodiment.

Under a Linux system, to do word segmentation to a file named "foo.txt", entering the directory containing the downloaded Stanford Chinese Word Segmenter and executing the following command can be utilized, according to an embodiment:

./segment.sh ctb foo.txt UTF-8 0>foo.seg

Executing the command above, the word segmentation result is written to file "foo.seg".

After tokenization, part-of-speech tagging is addressed. Again, there many open source tools for part-of-speech tagging both English and Chinese texts. In the preferred embodiment, Stanford POS Tagger available at nlp.stanford.edu can be utilized, according to an embodiment.

Under Linux system, to do word segmentation to a file named "foo.seg", entering the directory containing the downloaded Stanford POS Tagger and executing the following command can be utilized, according to an embodiment:

java -mx300m -classpath stanford-postagger.jar \
edu.stanford.nlp.tagger.maxent.MaxentTagger \
-model models/bidirectional-wsj-0-18 .tagger \
-textFile foo.seg \
>foo.pos Executing the command above, the word segmentation result is written to file "foo.seg".

Step 1.2: Doing word alignment on bitext.

Word alignment means to align words that are translation to each other in bitext. There are several open source word alignment tools. In an embodiment, GIZA++ can be utilized, according to an embodiment.

Under a Linux system, to do word alignment between a Chinese file "foo.ch" and an English file "foo.en". First make sure that the contents in "foo.ch" and "foo.en" are translation to each other. Then enter the directory containing the downloaded GIZA++ and execute the following command:

./tools/moses-scripts/scripts-20101118-1010/training/train-model.perl \
-scripts-root-dir ./tools/moses-scripts/scripts-20101118-1010 \
-root-dir ./work-corpus ./work/corpus/foo \
-f foo.ch -e foo.en -alignment intersection \
--first-step 1 --last-step 3>& wordAlignment.log Executing the command above, the word alignment result is written to file "aligned.intersection".

Step 1.3: Finding verb pairs that align to each other.

Use the part-of-speech tagging results to find all verbs. Then use the word alignment results to find aligned verb pairs.

According to an embodiment of the invention, the results obtained after Step 1 are shown in Table 2.

TABLE 2

[ Pred ]

中国 建筑 市场 近年 来 对外 开放 步伐 进一步 加快

In recent years the pace of opening up to the outside of China's construction market has further accelerated

[ Pred ]

Referring to Table 2, dashed lines show the word alignments. And the verb pair "accelerated/ 加快 " is found.

Step 2: For each predicate, using monolingual SRL method to generate argument candidates. The details are as follows:

As illustrated in FIG. 1, multiple monolingual SRL results on each side of bitext are needed. This invention uses monolingual SRL method to generate monolingual SRL results. In monolingual SRL method, the input is a syntactic parse tree and the output is a SRL result. To generate multiple SRL results, multiple parse trees are fed as inputs.

Step 2.1: For each sentence, using multiple parsing models to produce several parse trees.

According to an embodiment of the invention, five parse trees from three parsers are used as inputs to monolingual SRL method. The three parsers are: Berkeley parser
available at code.google.com, Bikel parser
available at cis.upenn.edu and Stanford parser available at nlp.stanford.edu. These three parsers are all open source tools freely downloadable. The 3-best parse trees from Berkeley parser, 1-best parse trees from Bikel and Stanford parsers are used as inputs.

Step 2.2: For each predicate, perform monolingual SRL multiple times to obtain several argument candidates, each time using one parse tree generated in Step 2.1.

According to an embodiment of the invention, the monolingual SRL method in Nianwen Xue. 2008. Labeling Chinese Predicates with Semantic Roles. *Computational Linguistics*, 34(2): 225-255 is adopted. This monolingual SRL method uses a maximum entropy classifier to label the arguments. Features used in the classifier for English and Chinese are chosen to be the same with those used in Sameer S. Pradhan, Wayne Ward, James H. Martin. 2008. Towards Robust Semantic Role Labeling. *Computational Linguistics*, 34(2):289-310 and Nianwen Xue. 2008. Labeling Chinese Predicates with Semantic Roles. *Computational Linguistics*, 34(2): 225-255. For convenience, these features are also listed in Table 8 and 9.

TABLE 8

| Feature names | Feature definitions |
| --- | --- |
| Position | Whether the constituent appears before or after predicate |
| Subcat Frame | The rule that expands the parent of the predicate |
| Phrase type | The syntactic category of the constituent in focus |
| Words | First and last word of the constituent in focus |
| Subcat Frame+ | The subcat frame that consists of the NPs that surround the predicate |
| Predicate | The verb itself |
| Path | The path between the constituent in focus and the predicate |
| Head word | Head word of the constituent and its part-of-speech tag |
| Path to BA and BEI | Path between the constituent in focus and the Chinese words '把' and '被' |
| Verb class | Verb class itself |
| Combination feature 1 | Predicate + Head word |
| Combination feature 2 | Predicate + Phrase Type |

TABLE 9

| Feature names | Feature definitions |
| --- | --- |
| Voice | Whether the predicate is realized as an active or passive construction |
| Predicate context | Two words before and two words after the predicate |
| Punctuation | Punctuations on the left and right of the constituent in focus |
| Named entities | Named Entities in Constituents |
| Position | Whether the constituent appears before or after predicate |
| Subcat Frame | The rule that expands the parent of the predicate |
| Phrase type | The syntactic category of the constituent in focus |
| POS tags | Part-of-speech tags of the first and last word of the constituent in focus |
| Words | First and last word of the constituent in focus |
| Subcat Frame+ | The subcat frame that consists of the NPs that surround the predicate |
| Predicate | The verb itself |
| Path | The path between the constituent in focus and the predicate |
| Head word | Head word of the constituent and its part-of-speech tag |
| Verb class | Verb class itself |

TABLE 9-continued

| Feature names | Feature definitions |
| --- | --- |
| Combination feature 1 | Predicate + Head word |
| Combination feature 2 | Predicate + Phrase Type |

In the experimental validation section, an open source maximum entropy classifier is employed.

Each argument in the monolingual SRL results has three attributes: its location in sentence loc, its label l, and its probability p. Therefore, each argument is a triple (loc, l, p) For example, referring to Table 3, the 'A0' argument is ((0, 2),A0,0.94)

TABLE 3

| Sent: | The little boy | found | a very big fish |
| --- | --- | --- | --- |
| Args: | [ A0 ] | [Pred] | [ A1 ] |
| loc: | (0, 2) | | (4, 7) |
| l: | A0 | | A1 |
| p: | 0.94 | | 0.92 |

According to an embodiment of the invention, 5 SRL results for each side are obtained using a monolingual SRL method. FIG. 1 showcases these 5 SRL results.

The open source parsers employed in the embodiment in Step 2.1 are also easy to use. For example, suppose it is desired to parse a word-segmented Chinese file named "foo.seg" and write the results to a file named "foo.parse". When using Berkeley parser, the following command is executed:

java -mx5g -jar ./berkeleyParser.jar \

-gr ./grammars/chn-sm5.gr \

-inputFile foo.seg -outputFile foo.parse

When using Bikel parser, the following command is executed:

./parse 2000./settings/chinese.properties \

../../trainingsets/chtb6_train4srl.obj.gz foo.seg>foo.parse

When using Stanford parser, the following command is executed:

java -mx2500m \

-cp "./stanford-parser.jar:" \ edu.stanford.nlp.parser.lexparser.LexicalizedParser \

-tLPP    edu.stanford.nlp.parser.lexparser.ChineseTreebankParserParams \

-tokenized -tagSeparator "#"-sentences newline \

-escaper \ edu.stanford.nlp.trees.international.pennchinese.ChineseEscaper \

-encoding "UTF-8"-outputFormat "oneline" \

-outputFormatOptions "removeTopBracket" \

-writeOutputFiles \

./chineseFactored4srl.ser.gz foo.seg

According to an embodiment of the invention, the results obtained after Step 2 are shown in Table 4.

TABLE 4

| CR1: [ | A1 | ] [AM-TMP] [ | C-A1 | ] [AM-MNR] | [PRED] |
|---|---|---|---|---|---|
| CR2: [ | | A1 | | ] [AM-ADV] | [PRED] |
| CR3: [ | A1 | ] [AM-TMP] [ | C-A1 | ] [AM-MNR] | [PRED] |
| CR4: [ | A1 | ] [ | AM-ADV | ] | [PRED] |
| CR5: [ | | A1 | | ] [AM-ADV] | [PRED] |

中国 建筑 市场 近年 来 对外 开放 步伐 进一步 加快

In recent years the pace of opening up to the outside of China's construction market has further accelerated

| ER1: [ | AM-TMP | ] [ | | A1 | | ] | [AM-EXT] | [PRED] |
|---|---|---|---|---|---|---|---|---|
| ER2: [ | AM-TMP | ] [ | A1 | ] [ | A4 | ] | [ A2 ] | [PRED] |
| ER3: [ | AM-TMP | ] [ | | A1 | | ] | [ A2 ] | [PRED] |
| ER4: [ | AM-TMP | ] [ | | ] [ | A1 | ] | [AM-EXT] | [PRED] |
| ER5: [ | AM-TMP | ] [ | A1 | ] [ | AM-LOC | ] | [AM-EXT] | [PRED] |

Table 4 shows the five SRL results on Chinese side, CR1~CR5, and results on English side ER1~ER5. The five results are obtained using five parsing results from Berkeley, Bikel and Stanford parsers. As shown in Table 4, two SRL results can be the same, e.g. CR1 and CR3 coincides. Every argument in a SRL result is an argument candidate. For example, there are two candidate arguments in CR5, the first one, labeled as A1, contains the words numbered from 0 to 8 in Chinese sentence, and has a probability 0.83, although probabilities of arguments are not shown in Table 4. So this argument candidate is ((0, 8), A1, 0.83). Similarly, the second argument candidate in CR5 is ((9, 9), AM-ADV, 0.90).

Step 3: For each predicate, merging its duplicate argument candidates into one.

According to an embodiment of the invention, duplicate argument candidates are defined to be the argument candidates that have the same location and label. The duplicate arguments are merged into one by keeping the location and label while averaging their probabilities. Take the embodiment shown in Table 4 as an example. All argument candidates that have location (0, 2) and label A1 are: the argument ((0, 2), A1, 0.92) in CR1, the argument ((0, 2), A1, 0.92) in CR3, and the argument ((0, 2), A1, 0.98) in CR4. The argument obtained by merging the three duplicate arguments above is ((0, 2), A1, 0.94), where 0.94 is obtained by averaging 0.92, 0.92, and 0.98. Similarly, other duplicate arguments are also merged. In an embodiment, after merging, eight arguments on the Chinese side are obtained:

((0, 2), A1, 0.94), ((3, 4), AM-TMP, 0.92), ((5, 8), C-A1, 0.90), ((9, 9), AM-MNR, 0.81), ((0, 8), A1, 0.90), ((9, 9), AM-ADV, 0.93), ((3, 8), AM-ADV, 0.80), ((0, 8), A1, 0.90).

Step 4: For each word-aligned predicate pair, performing joint inference to obtain their arguments and the alignment between these arguments.

According to an embodiment of the invention, to describe step 4 conveniently, many mathematical symbols are used. These symbols are listed in Table 5 for convenience.

TABLE 5

| Symbols | Meaning of the symbols |
|---|---|
| Upper script $^s$ or lower script $_s$ | Source side of bitext |
| Upper script $^t$ or lower script $_t$ | Target side of bitext |
| Upper script $^a$ or lower script $_a$ | The argument alignment between source and target side |
| $L_s$ | Total number of semantic roles in source language |
| $\{l_1^s, l_2^s, \ldots, l_{L_s}^s\}$ | The set of semantic role labels in source language |
| $l_1^s \sim l_6^s$ | Key semantic role labels on source side: A0~A5 |

TABLE 5-continued

| Symbols | Meaning of the symbols |
|---|---|
| $N_s$ | Number of different locations in source side argument candidates |
| $\{loc_1^s, \ldots, loc_{N_s}^s\}$ | The set of locations in source side argument candidates |
| $p_{ij}^s$ | The probability of assigning label $l_j^s$ to location $loc_i^s$ |
| $arg_i^s$ | An argument located at $loc_i^s$ |
| $L_t$ | Total number of semantic roles in target language |
| $\{l_1^t, l_2^t, \ldots, l_{L_t}^t\}$ | The set of semantic role labels in target language |
| $l_1^t \sim l_6^t$ | Key semantic role labels on target side: A0~A5 |
| $N_t$ | Number of different locations in target side argument candidates |
| $\{loc_1^t, \ldots, loc_{N_t}^t\}$ | The set of locations in target side argument candidates |
| $p_{kj}^t$ | The probability of assigning label $l_j^t$ to location $loc_k^t$ |
| $arg_k^t$ | An argument located at $loc_k^t$ |
| $p_{ik}^a$ | The probability of aligning sourse side argument $arg_i^s$ and target side argument $arg_k^t$ |

Joint inference in this invention considers three interrelated factors: the quality of the SRL result on the source side, the quality of the SRL result on the target side, and the argument structure consistency between the SRL results on both sides. Therefore, there are three components in joint inference: the source side, the target side, and the argument alignment. The objective function of our joint inference model is the weighted sum of three sub-objectives:

$$\max O_s + \lambda_1 O_t + \lambda_2 O_a \quad (1)$$

where $O_s$ and $O_t$ represent the quality of the SRL results on source and target sides, and $O_a$ represents the soundness of the argument alignment between the SRL results on two sides, $\lambda_1$ and $\lambda_2$ are positive weights corresponding to the importance of $O_t$ and $O_a$ respectively. $\lambda_1$ and $\lambda_2$ are empirically set to 1.02 and 1.21 respectively.

4.1 Source Side Component

The source side component aims to improve the SRL result on the source side. This is equivalent to a monolingual SRL combination problem.

As shown in Table 5, $L_s$ is the total number of semantic roles in source language. $\{l_1^s, l_2^s, \ldots, l_{L_s}^s\}$ is the set of semantic role labels in source language, in which $l_1^s \sim l_6^s$ are key semantic role labels A0~A5. There are $N_s$ different locations in source side argument candidates: $\{loc_1^s, \ldots, loc_{N_s}^s\}$. For example, in FIG. 1, there are eight argument candidates and seven different locations on the Chinese side because two candidates, ((9, 9), AM-MNR, 0.81) and ((9, 9), AM-ADV, 0.93), have the same location.

Define indicator variable $x_{ij}$ to be:

$$x_{ij} = \begin{cases} 1 & \text{If } loc_i^s \text{ is assigned } l_j^s \\ 0 & \text{otherwise} \end{cases} (1 \leq i \leq N_s, 1 \leq j \leq L_s)$$

Then the source side sub-objective $O_s$ in equation (1) is the sum of the arguments' probabilities on the source side:

$$O_s = \sum_{i=1}^{N_s} \sum_{j=1}^{L_s} (p_{ij}^s - T_s) x_{ij} \quad (2)$$

where $T_s$ is a threshold empirically set to 0.15 to filter out candidates that have very small probabilities.

The source side component has the following two types of constraints:

1) No duplication for the key argument types: A0~A5. For example, in FIG. 1, the candidates ((0, 2), A1, 0.94) and ((0, 8), A1, 0.90) cannot be in the SRL result at the same time because they have the same key argument type A1.

2) No overlapping of argument locations. For example, in FIG. 1, the candidates ((3, 4), AM-TMP, 0.92) and ((3, 8) AM-ADV, 0.80) cannot be in the SRL result at the same time because they overlap on words in range (3, 4).

To enforce that each location is assigned at most one label, the constraints represented by equation (3) are needed.

$$\forall 1 \leq i \leq N_s : \sum_{j=1}^{L_s} x_{ij} \leq 1 \quad (3)$$

The "No duplication for the key argument types" constraint is represented by equation (4):

$$\forall 1 \leq j \leq 6 : \sum_{i=1}^{N_s} x_{ij} \leq 1 \quad (4)$$

For any location $loc_i^s$, let $C_i$ denote the index set of the locations that overlap with it. Then the "No overlapping of argument locations" constraint is represented by equation (5):

$$\forall 1 \leq i \leq N_s : \sum_{u \in C_i} \sum_{j=1}^{L_s} x_{uj} \leq \left(1 - \sum_{j=1}^{L_s} x_{ij}\right) M \quad (5)$$

where M is a constant that is larger than the number of candidates to be combined. Usually, setting M to 500 is fine. According to an embodiment, the constraints in equations (3-5) are implemented automatically in a computer. The pseudo-code for implementing these constraints are given below, according to an embodiment:

Input: The set of argument candidates on source side: ArgSet.
Output: The set of constraints: ConstraintsSet.
1. Counting $N_s$, which is the number of different locations in ArgSet.
2. lhs=0
3. for i from 1 to $N_s$:
4. for j from 1 to $L_s$:
5. lhs+=$x_{ij}$
6. Adding constraint: lhs<=1 to ConstraintsSet
7. lhs=0
8. for j from 1 to 6:
9. for i from 1 to $N_s$:
10. lhs+=$x_{ij}$
11. Adding constraint: lhs<=1 to ConstraintsSet
12. for i from 1 to $N_s$:
13. Finding $C_i$, which is the index set of the locations that overlap with $loc_i^s$
14. sum=0
15. for j from 1 to $L_s$:
16. sum+=$x_{ij}$
17. lhs=0
18. for u in $C_i$:
19. for j from 1 to $L_s$:
20. lhs+=$x_{ij}$
21. Adding constraint: lhs<=(1-sum)*M (M=500) to ConstraintsSet
22. Return ConstraintsSet 4.2 Target Side Component In principle, the target side component of the joint inference model is the same with the source side component.

As shown in Table 5, $L_t$ is the total number of semantic roles in the target language. $\{l_1^t, l_2^t, \ldots, l_{L_t}^t\}$ is the set of semantic role labels in the target language, in which $l_1^t$~$l_6^t$ are key semantic role labels A0~A5. There are $N_t$ different locations in target side argument candidates: $\{loc_1^t, \ldots, loc_{N_t}^t\}$.

Define indicator variable $y_{kj}$ to be:

$$y_{kj} = \begin{cases} 1 & \text{If } loc_k^t \text{ is assigned } l_j^t \\ 0 & \text{otherwise} \end{cases} (1 \leq k \leq N_t, 1 \leq j \leq L_t)$$

Then the source side sub-objective $O_t$ in equation (1) is the sum of the arguments' probabilities on source side:

$$O_t = \sum_{k=1}^{N_t} \sum_{j=1}^{L_t} (p_{kj}^t - T_t) y_{kj} \quad (6)$$

where $T_t$ is a threshold empirically set to 0.26 to filter out candidates that have very small probabilities.

To enforce that each location is assigned at most one label, the constraints represented by equation (7) are needed.

$$\forall 1 \leq k \leq N_t : \sum_{j=1}^{L_t} y_{kj} \leq 1 \quad (7)$$

The "No duplication for the key argument types" constraint is represented by equation (8):

$$\forall 1 \leq j \leq 6 : \sum_{k=1}^{N_t} y_{kj} \leq 1 \quad (8)$$

the "No overlapping of argument locations" constraint is represented by equation (9):

$$\forall 1 \leq k \leq N_t : \sum_{v \in C_k} \sum_{j=1}^{L_t} y_{vj} \leq \left(1 - \sum_{j=1}^{L_t} y_{kj}\right) M \quad (9)$$

where $C_k$ denotes the index set of the locations that overlap with $loc_k^t$, and the constant M is set to 500.

By substituting source side variables to corresponding target side variables in the pseudo-code for implementing constraints (3-5), the pseudo-code for implementing constraints (7-9) is obtained.

4.3 Argument Alignment Component

The argument alignment component is the core of our joint inference model. It gives preference to the bilingual SRL results that have more consistent argument structures.

For a source side argument $arg_i^s=(loc_i^s, l^s)$ and a target side argument $arg_k^t=(loc_k^t, l^t)$, let $z_{ik}$ be the following indicator variable:

$$z_{ik} = \begin{cases} 1 & \text{If } arg_i^s \text{ aligns with } arg_k^t \\ 0 & \text{otherwise} \end{cases} \quad (1 \le i \le N_s, 1 \le k \le N_t)$$

Let $p_{ik}^a$ be the probability that $arg_i^s$ aligns with $arg_k^t$, i.e. $p_{ik}^a = P(z_{ik}=1)$.

4.3.1 Argument Alignment Probability Model

According to an embodiment of the invention, a log-linear model is used to compute the probability $p_{ik}^a$. Let (s,t) be a bilingual sentence pair, wa be the word alignments between (s,t), then the log-linear model gives the distribution of $z_{ik}$ give the tuple tup=($arg_i^s$, $arg_k^t$, wa, s, t):

$$P(z_{ik}|tup) \propto \exp(w^T \phi(tup))$$

where $\phi(tup)$ is the feature vector, w is the weight vector corresponding to the features. With this model, $p_{ik}^a$ is computed as:

$$p_{ik}^a = P(z_{ik}=1|tup)$$

$\phi(tup)$ contains the following features:

1) Word alignment feature, defined to the word alignment-based word overlap between two arguments as described in Sebastian Pado, and Mirella Lapata. 2009. Cross-lingual Annotation Projection of Semantic Roles. Journal of Artificial Intelligence Research, 36:307-340. Take the Chinese argument ((0, 2), A1, 0.94) and the English argument ((3, 15), A1, 0.98) in FIG. 1 as an example, the word alignment feature between these two arguments is 0.52.

2) Head word alignment feature, whether the head words "将" of two argument aligns with each other. For example, in FIG. 1, the head word of the Chinese argument ((0, 2), A1, 0.94) is "市场", and the head word of the English argument ((3, 15), A1, 0.98) is "market". These two head words align with each other. So the head word alignment feature for these two arguments is "Yes".

3) Semantic role labels of two arguments. For example, in FIG. 1, this feature for the Chinese argument ((0, 2), A1, 0.94) and English argument ((3, 15), A1, 0.98) is: A1, A1.

4) Predicate verb pair. For example, this feature for the Chinese argument ((0, 2), A1, 0.94) and English argument ((3, 15), A1, 0.98) is: '加快, accelerated'.

4.3.2 Argument Alignment Component

The argument alignment sub-objective $O_a$ in equation (1) is the sum of argument alignment probabilities:

$$O_a = \sum_{i=1}^{N_s} \sum_{k=1}^{N_t} (p_{ik}^a - T_a) z_{ik} \quad (10)$$

where $T_a$ is a threshold empirically set to 0.15 to filter out candidates that have very small probabilities, and $p_{ik}^a$ is computed using the log-linear model described in subsection 4.3.1.

$O_a$ reflects the consistency between argument structures on two sides of bitext. Larger $O_a$ means better argument alignment between two sides, thus indicating more consistency between argument structures on two sides.

In an embodiment, the Argument Alignment Component has three types of constraints:

1) Conformity with bilingual SRL result. For all candidates on both source and target sides, only those that are chosen to be arguments on each side can be aligned.

2) One-to-many alignment limit. Each argument cannot be aligned with more than 3 arguments.

3) Complete argument alignment. Each argument on source side should be aligned with at least one argument on target side, and vice versa. This is a soft constraint: violation of this constraint is allowed but with penalties enforced.

The Conformity with bilingual SRL result constraint is necessary to validly integrate the bilingual SRL result with the argument alignment. The Conformity with bilingual SRL result constraint is necessary to validly integrate the bilingual SRL result with the argument alignment. It can be represented by equations (11, 12):

$$\forall 1 \le i \le N_s, 1 \le k \le N_t : \sum_{j=1}^{L_s} x_{ij} \ge z_{ik} \quad (11)$$

$$\forall 1 \le k \le N_t, 1 \le i \le N_s : \sum_{j=1}^{L_t} y_{kj} \ge z_{ik} \quad (12)$$

The One-to-many alignment limit constraint comes from our observation on manually aligned corpus. In an embodiment, no argument aligns with more than 3 arguments in our manually aligned corpus. This constraint can be represented by equations (13, 14):

$$\forall 1 \le i \le N_s : \sum_{k=1}^{N_t} z_{ik} \le 3 \quad (13)$$

$$\forall 1 \le k \le N_t : \sum_{i=1}^{N_s} z_{ik} \le 3 \quad (14)$$

The Complete argument alignment constraint comes from the semantic equivalence between two sides of bitext.

If an argument does not align with any argument on the other side, state that it aligns with NUL. Define a indicator variable:

$$z_{i,NUL} = \begin{cases} 1 & \text{If } arg_i^s \text{ aligns with } NUL \\ 0 & \text{otherwise} \end{cases}, 1 \le i \le N_s$$

$$z_{NUL,k} = \begin{cases} 1 & \text{If } arg_k^t \text{ aligns with } NUL \\ 0 & \text{otherwise} \end{cases}, 1 \le k \le N_t$$

A penalty $\lambda_3$ will be enforced to any argument that aligns with NUL. Then, the sub-objective $O_a$ in equation (10) is changed to sub-objective:

$$O_a = \sum_{i=1}^{N_s} \sum_{k=1}^{N_t} (p_{ik}^a - T_a) z_{ik} - \lambda_3 \left( \sum_{i=1}^{N_s} z_{i,NUL} + \sum_{k=1}^{N_t} z_{NUL,k} \right) \quad (15)$$

where $\lambda_3$ and $T_a$ are empirically set to 0.15 and 0.42 respectively.

To make $z_{i,NUL}$ and $z_{NUL,k}$ conform with other variables $z_{ik}$, the constraints in equations (16-19) are needed:

$$\forall 1 \leq i \leq N_s, 1 \leq k \leq N_t : z_{i,NUL} \leq 1 - z_{ik} \quad (16)$$

$$\forall 1 \leq i \leq N_s : \sum_{k=1}^{N_t} z_{ik} + z_{i,NUL} \geq 1 \quad (17)$$

$$\forall 1 \leq k \leq N_t, 1 \leq i \leq N_s : z_{NUL,k} \leq 1 - z_{ik} \quad (18)$$

$$\forall 1 \leq k \leq N_t : \sum_{i=1}^{N_s} z_{ik} + z_{NUL,k} \geq 1 \quad (19)$$

According to an embodiment, the pseudo-code for implementing constraints (11-14, 16-19) are given below:
Input: The argument candidates from both source and target sides.
Output: The set of constraints: ConstraintsSet.
1. Counting $N_s$ and $N_t$, which are the number of different locations in source and target side candidates respectively.
2. for i from 1 to $N_s$:
3. for k from 1 to $N_t$:
4. lhs=0
5. for j from 1 to $L_s$:
6. lhs+=$x_{ij}$
7. Adding constraint: lhs>=$z_{ik}$ to ConstraintsSet
8. for k from 1 to $N_t$:
9. for i from 1 to $N_s$:
10. lhs=0
11. for j from 1 to $L_t$:
12. lhs+=$y_{kj}$
13. Adding constraint: lhs>=$z_{ik}$ to ConstraintsSet
14. for i from 1 to $N_s$:
15. lhs=0
16. for k from 1 to $N_t$:
17. lhs+=$z_{ik}$
18. Adding constraint: lhs<=3 to ConstraintsSet
19. for k from 1 to $N_t$:
20. lhs=0
21. for i from 1 to $N_s$:
22. lhs+=$z_{ik}$
23. Adding constraint: lhs<=3 to ConstraintsSet
24. for i from 1 to $N_s$:
25. sum=0
26. for k from 1 to $N_t$:
27. sum+=$z_{ik}$
28. Adding constraint: $z_{i,NUL}$<=1-$z_{ik}$ to ConstraintsSet
29. Adding constraint: sum+$z_{i,NUL}$>=1 to ConstraintsSet
30. for k from 1 to $N_t$:
31. sum=0
32. for i from 1 to $N_s$:
33. sum+=$z_{ik}$
34. Adding constraint: $z_{NUL,k}$<=1-$z_{ik}$ to ConstraintsSet
35. Adding constraint: sum+$z_{NUL,k}$>=1 to ConstraintsSet
36. Return ConstraintsSet 4.4 Summary of Joint Inference In sub-sections 4.1-4.3, an integer linear programming model for joint inference is described, according to an embodiment. The objective of joint inference is defined by equations (1), (2), (6), and (15). The constraints of joint inference is defined by equations (3-5), (7-9), (11-14) and (16-19). There are three groups of indicator variables in the joint inference model: The first group is $x_{ij}(1 \leq i \leq N_s, 1 \leq j \leq L_s)$, which gives the SRL result on source side; The second groups is $y_{kj}(1 \leq k \leq N_t, 1 \leq j \leq L_t)$, which gives the SRL result on source side; The third group is $z_{ik}(1 \leq i \leq N_s, 1 \leq k \leq N_t)$, $z_{i,NUL}(1 \leq i \leq N_s)$, $z_{NUL,k}(1 \leq k \leq N_t)$, which gives the argument alignment between source and target sides.

After the joint inference model is set up, use a integer linear programming toolkit to solve the model and obtain the bilingual SRL result. In an embodiment, the open source tool 'lpsolve', available at sourceforge.net, is employed to solve the joint inference model. For the embodiment illustrated in FIG. 1, joint inference produces the correct bilingual SRL result shown in FIG. 2. All red argument candidates in FIG. 1 are correct arguments. FIG. 2 shows that all correct arguments are obtained by joint inference. Moreover, joint inference also found the argument alignment shown by the arrows in FIG. 2.

EXPERIMENTAL VALIDATION

1. Experimental Setup

To validate the effects of this invention, experiments were carried out on a widely-used dataset: the Xinhua News portion of Chinese and English data in OntoNotes Release 3.0 distributed by Linguistic Data Consortium (LDC). This data is a Chinese-English parallel PropBank containing parallel proposition annotations for 325 files (chtb 0001.fid to chtb 0325.fid) from Chinese-English parallel Treebank.

The GIZA++ toolkit is employed to perform automatic word alignment, according to an embodiment. Besides the parallel PropBank data, an additional 4,500K Chinese-English sentence pairs are used to induce word alignments.

80 files (chtb_0001.fid to chtb_0080.fid) are used as test data, and 40 files (chtb_0081.fid to chtb_0120.fid) as development data. Although the joint inference model needs no training, a log-linear argument alignment probability model needs to be trained, which is used in the joint inference model. 60 files (chtb_0121.fid to chtb_0180.fid) with human annotated argument alignment are used to train the log-linear argument alignment probability model. The monolingual SRL systems are trained separately. The Chinese SRL system is trained on 640 files (chtb_0121.fid to chtb_0931.fid) in Chinese Propbank 1.0. Because Xinhua News is a quite different domain from WSJ, the training set for our English SRL system includes not only Sections 02~21 of WSJ data in English Propbank, but also 205 files (chtb_0121.fid to chtb_0325.fid) in the English part of parallel PropBank.

2. Experiment Results

Table 6 shows the performance evaluation of the monolingual SRL systems described in Step 2. In Table 6, Out1~Out3 are scores of SRL results obtained by using the 3-best parsing results from Berkeley parser. Out4 and Out 5 are scores of SRL results obtained by using the 1-best parsing results from Stanford and Bikel parser respectively.

TABLE 6

The results of individual monolingual SRL systems

| Side | Outputs | P (%) | R (%) | F1 |
|---|---|---|---|---|
| Chinese | Out1 | 79.84 | 71.95 | 75.69 |
|  | Out2 | 78.53 | 70.32 | 74.20 |
|  | Out3 | 78.41 | 69.99 | 73.96 |
|  | Out4 | 73.21 | 67.13 | 70.04 |
|  | Out5 | 75.32 | 63.78 | 69.07 |
| English | Out1 | 80.43 | 73.70 | 76.92 |
|  | Out2 | 79.37 | 72.70 | 75.89 |
|  | Out3 | 79.26 | 71.93 | 75.42 |
|  | Out4 | 74.43 | 69.37 | 71.81 |
|  | Out5 | 76.59 | 66.05 | 70.93 |

The monolingual SRL combination method in Mihai Surdeanu, Llú is Marquez, Xavier Carreras, and Pere R. Comas. 2007. Combination Strategies for Semantic Role Labeling. *Journal of Artificial Intelligence Research* (*JAIR*), 29:105-151. is used as the baseline to compare with this invention. The baseline represents the state-of-the-art for SRL. The experiment results are shown in Table 7, where 'MonoCmb' and 'Joint' denote the results of the baseline and this invention respectively.

TABLE 7

Results of this invention 'Joint' and a baseline method 'MonoCmb'

| Side | System | P(%) | R(%) | F1 |
|---|---|---|---|---|
| Chinese | MonoCmb | 82.58 | 73.92 | 78.01 |
|  | Joint | 83.57 | 76.83 | 80.06 |
| English | MonoCmb | 81.53 | 77.39 | 79.41 |
|  | Joint | 82.77 | 79.53 | 81.12 |

From Table 6 and Table 7, it can be seen that the F1 scores of the baseline 'MonoCmb' are 2.32 and 2.49 points higher than the best individual monolingual SRL results on Chinese and English respectively. This manifests that 'MonoCmb' forms a strong baseline. Even so, Table 7 shows that the F1 scores of this invention are 2.05 and 1.71 points higher than that of the baseline on English and Chinese sides respectively. On English side, the F1 score of this invention is 81.12%, which is comparable to the best SRL result reported in the literature. On Chinese side, the F1 score of this invention reaches 80.06%, which is better than any reported results before.

We claim:

1. A method of bilingual Semantic Role Labeling (SRL) for use in a machine translation of a first language to a second language, the method comprising:
   inputting a data file containing a bilingual sentence pair into a computer comprising a processor and a memory, the method further comprising:
   Step 1: Tokenizing, by the processor, the bilingual sentence pair and finding word-aligned predicate pairs in the bilingual sentence pair;
   Step 2: For each predicate, using a monolingual SRL method to generate argument candidates by the processor;
   Step 3: For each predicate, merging its duplicate argument candidates into one by the processor, wherein, argument candidates that have a same location and semantic role label are the duplicate argument candidates, and the duplicate argument candidates are merged into one by retaining the location and semantic role label and averaging probabilities of all the duplicate argument candidates; and
   Step 4: For each word-aligned predicate pair, performing joint inference by the processor with respect to a merging result obtained by Step 3 to obtain a result data file containing arguments for each word-aligned predicate pair and an alignment between said arguments, the result data file training the machine to translate the first language to the second language.

2. The method of claim 1, wherein step 1 further comprises tokenizing each sentence into a bilingual sentence pair and performing part-of-speech tagging and word-alignment for the bilingual sentence pair.

3. The method of claim 1, wherein step 1 further comprises finding verb pairs that align to each other, wherein the word-aligned word pairs are examined one by one and all word-aligned verb pairs are identified.

4. The method of claim 1, wherein step 2 further comprises:
   Step 2.1: For each sentence, using multiple parsing models to produce several parse trees; and
   Step 2.2: For each predicate, performing monolingual SRL multiple times to obtain several argument candidates, each time using one parse tree generated in Step 2.1.

5. The method of claim 4, wherein in Step 2.1, multiple parsing models are chosen to be different open-source parsers, including Berkeley parser, Bikel parser and Stanford parser.

6. The method of claim 4, wherein in Step 2.2, the monolingual SRL system is based on maximum entropy classifiers, the input to the monolingual SRL system is a syntactic parse tree, and the maximum entropy classifiers are employed to label each predicate in the input parse tree and return the SRL result.

7. The method of claim 1, wherein the performance of the joint inference in step 4 produces an SRL result on a source side and an SRL result on a target side and the joint interference is based on: a correctness of the SRL result on the source side, a correctness of the SRL result on the target side, and an argument structure consistency between the SRL results on the source side and the target side.

8. The method of claim 7, wherein when considering the correctness of the SRL result on the source side or the target side, the objective is to maximize an expectation of a number of correctly labeled arguments, and a plurality of constraints comprise:
   1) No duplication: There is no duplication for key arguments: A0~A5; and
   2) No overlapping: Arguments cannot overlap with each other.

9. The method of claim 7, wherein evaluating the argument structure consistency between the SRL results on the source side and the target side comprises using a log linear model to compute a probability of aligning two arguments from a source side and a target side wherein the log linear model comprises:
   1) Word-alignment feature: a word alignment-based similarity score between the two arguments;
   2) Head word alignment feature: whether head words of the two arguments align with each other;
   3) Semantic role labels of the two arguments; and
   4) Predicate verb pair.

10. The method of claim 9, wherein computing the probability of aligning two arguments further comprises: training the log linear model on a bilingual SRL corpus with argument alignments and using the trained model to compute the probability for aligning new arguments.

11. The method of claim 7, wherein when considering the argument structure consistency between the SRL results on the source side and the target side, the objective is to maximize a number of correctly aligned arguments, and plurality of constraints comprise:
   1) Conformity with bilingual SRL result: For all candidates on both source and target sides, only those that are chosen to be arguments on each side are aligned;
   2) One-to-many alignment limit: An argument cannot align with more than three arguments; and
   3) Complete argument alignment: Each argument on the source side is aligned with at least one argument on the target side, and vice versa, wherein a penalty is induced when this constraint is violated.

12. The method of claim 1, wherein in step 4, the processor formulates a bilingual SRL problem of machine translation of the first language to the second language to an Integer Linear Programming (ILP) problem and solves the ILP problem to produce a bilingual SRL result.

13. The method of claim 12, wherein formulating an ILP model for the joint inference further comprises:
computing a sub-objective on source and target sides of the bilingual sentence pair;
computing an argument structure consistency sub-objective;
adding all sub-objectives to obtain a total objective;
adding constraints from the source side and the target side of the bilingual sentence pair; and
solving the ILP model with the total objective and constraints.

14. A method of bilingual SRL for use in a machine translation of a first language to a second language, the method comprising:
inputting a data file containing a bilingual sentence pair into a computer comprising a processor and a memory, the method further comprising:
Step 1: Tokenizing, by the processor the bilingual sentence pair and finding word-aligned predicate pairs in the bilingual sentence pair;
Step 2: For each predicate, using monolingual SRL method to generate argument candidates by the processor;
Step 3: For each predicate, merging its duplicate argument candidates into one processor;
Step 4: For each word-aligned predicate pair, performing joint inference by the processor with respect to a merging result obtained by Step 3 to obtain a result data file containing arguments of the word-aligned predicate pair and alignment between these arguments, the result data file training the machine for translation of the first language to the second language,
wherein the performing of the joint inference in step 4 produces an SRL result on a source side and an SRL result on a target side, and the joint inference is based on: a correctness of SRL result on the source side, a correctness of SRL result on target side, and a argument structure consistency between the SRL results on both sides.

15. The method of claim 14, further comprising: when considering the correctness of the SRL result on the source side or the target side, the expectation of a number of correctly labeled arguments is maximized, and a plurality of constraints comprising:
1) No duplication: There is no duplication for key arguments: A0~A5;
2) No overlapping: Arguments cannot overlap with each other.

16. The method of claim 14, further comprising the step of, when considering the argument structure consistency between the SRL results on the source side and the target side, maximizing, as an objective, a number of correctly aligned arguments, and a plurality of constraints comprising:
1) Conformity with bilingual SRL result: For all candidates on both source and target sides, only those that are chosen to be arguments on each side are aligned;
2) One-to-many alignment limit: An argument cannot align with more than three arguments;
3) Complete argument alignment: Each argument on the source side should be aligned with at least one argument on the target side, and vice versa and a penalty is induced when this constraint is violated.

17. The method of claim 16 wherein formulating an ILP model for the joint inference further comprises, computing a sub-objective on the source side and the target side of a bilingual sentence pair, computing an argument structure consistency sub-objective, adding all the sub-objectives to obtain a total objective, adding constraints from the source side and the target side of the bilingual sentence pair, and solving the ILP model with the total objective and the constraints.

18. A computer-implemented method of bilingual SRL for use in a machine translation of a first language to a second language, the method comprising, the method comprising:
inputting a data file containing a bilingual sentence pair into a computer comprising a processor and a memory, the method further comprising:
Step 1: Tokenizing the bilingual sentence pair and finding word-aligned predicate pairs in the bilingual sentence pair;
Step 2: For each predicate, using a monolingual SRL method to generate argument candidates by the processor, comprising:
Step 2.1: For each sentence, using multiple parsing models to produce several parse trees, wherein the multiple parsing models are chosen to be different open-source parsers, including Berkeley parser, Bikel parser and Stanford parser; and
Step 2.2: For each predicate, perform monolingual SRL multiple times to obtain several argument candidates, each time using one parse tree generated in Step 2.1;
Step 3: For each predicate, merging its duplicate argument candidates into one processor;
Step 4: For each word-aligned predicate pair, performing joint inference by the processor with respect to a merging result obtained by Step 3 to obtain the arguments for each word-aligned predicate pair and an alignment between said arguments in a results data file, the result data file training the machine for translation of the first language to the second language,
the method further comprising:
evaluation of an argument structure consistency between SRL results on a source side and a target side, using a log linear model to compute a probability of aligning two arguments from a source side and a target side, respectively, by the processor, and the log linear model making use of a plurality of features comprising:
1) Word-alignment feature: a word alignment-based similarity score between the two arguments,
2) Head word alignment feature: whether head words of the two arguments align with each other,
3) Semantic role labels of the two arguments,
4) Predicate verb pair.

19. The method of claim 18, the step for computing the probability of aligning two arguments further comprising, training the log linear model on a bilingual SRL corpus with argument alignments and using the trained model to compute the probability for aligning new arguments.

* * * * *